(12) United States Patent
Burton et al.

(10) Patent No.: US 7,270,315 B2
(45) Date of Patent: Sep. 18, 2007

(54) EXCHANGE COLUMN, PERFORATED TRAY ASSEMBLY

(75) Inventors: Larry W Burton, Desoto, TX (US); Farzad G. Tahmassi, Carrollton, TX (US); Francis W. Lemon, Ottawa (CA)

(73) Assignee: AMT International, Inc., Richardson, TX (US)

( * ) Notice: Subject to any disclaimer, the term of this patent is extended or adjusted under 35 U.S.C. 154(b) by 14 days.

(21) Appl. No.: 11/124,046

(22) Filed: May 9, 2005

(65) Prior Publication Data

US 2006/0065988 A1    Mar. 30, 2006

Related U.S. Application Data

(63) Continuation-in-part of application No. 10/950,546, filed on Sep. 28, 2004, now abandoned.

(51) Int. Cl.
*B01F 3/04* (2006.01)
(52) U.S. Cl. .................. 261/114.1; 261/114.5
(58) Field of Classification Search ............ 261/114.1, 261/114.2, 114.3, 114.4, 114.5; 202/158
See application file for complete search history.

(56) References Cited

U.S. PATENT DOCUMENTS

| | | | | |
|---|---|---|---|---|
| 3,233,708 A | * | 2/1966 | Glitsch | 52/483.1 |
| 4,120,919 A | * | 10/1978 | McClain | 261/114.5 |
| 6,068,244 A | * | 5/2000 | Burton et al. | 261/114.4 |
| 6,422,539 B1 | * | 7/2002 | Burton et al. | 261/114.4 |
| 6,592,106 B1 | * | 7/2003 | Eaton, Jr. | 261/114.3 |
| 6,629,687 B1 | * | 10/2003 | Gage | 261/114.5 |
| 6,755,943 B1 | * | 6/2004 | Mizutani et al. | 203/99 |
| 2003/0019737 A1 | * | 1/2003 | Matsumoto et al. | 203/99 |

* cited by examiner

*Primary Examiner*—Scott Bushey
(74) *Attorney, Agent, or Firm*—Spencer S. Chen; Francis Lemon

(57) ABSTRACT

In, for example, a gas-liquid, liquid/liquid exchange column, perforated tray assemblies are provided which have a plurality of adjacent tray sections with slots adjacent rounded leading edges of the sections, and catches extending along trailing edges which interlock in the slots of an adjacent section. This interlocking avoids the use of bolted joints which cause stagnant areas where sediment accumulation occurs, resulting in reduced gas-liquid and liquid/liquid contact, and the need for the tray sections to be frequently cleaned. Perforated domes may be provided on perforations to reduce stagnant areas.

7 Claims, 4 Drawing Sheets

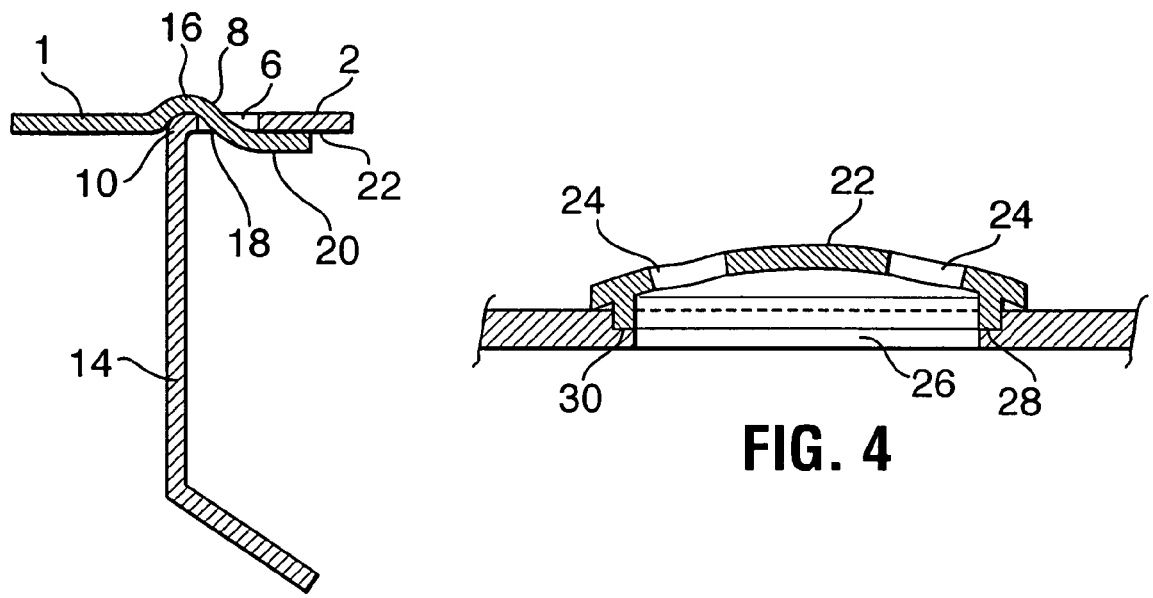
FIG. 3
FIG. 4
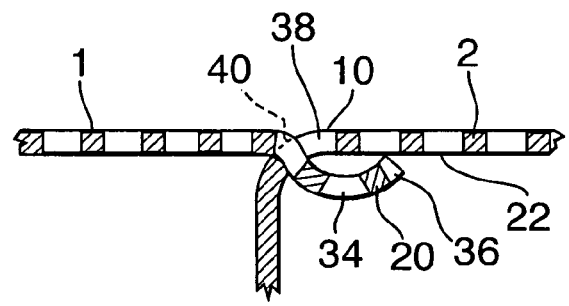
FIG. 5
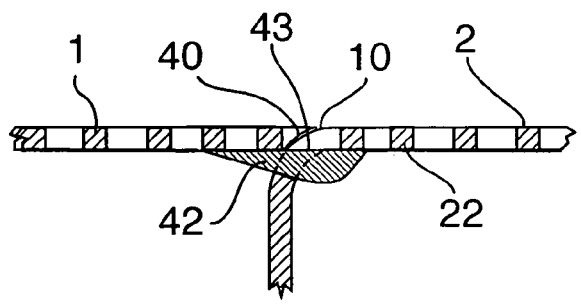
FIG. 6

EXCHANGE COLUMN, PERFORATED TRAY ASSEMBLY

This is a continuation-in-part application of application Ser. No. 10/950,546, filed Sep. 28, 2004, now abandoned.

FIELD OF THE INVENTION

This invention relates to an exchange column, perforated tray assembly.

BACKGROUND OF THE INVENTION

Perforated tray assemblies are commonly used in exchange columns for effecting exchange between a descending liquid and an ascending gas or liquid in, for example, distillation, absorption or the like.

In this specification "gas" includes vapor.

Known perforated tray assemblies are composed of a number of adjacent sections which are bolted in position, and a problem that arises is that stagnant areas occur in the regions of the bolted joints causing sediment accumulation, thus reducing, for example, gas/liquid contact, and, depending on the particular use, can cause polymerization of components of the liquid which can accelerate even further sediment build-up. These problems can only be alleviated by increasing the column size, to increase the handling capacity, and frequent cleaning.

There is a need for an exchange column, perforated tray assembly wherein no bolted joints are necessary for securing adjacent sections together and consequently stagnant areas adjacent the supports are significantly reduced, together with time needed to assemble and disassemble the tray sections, thereby increasing the handling capacity of the tray assembly and significantly reducing the time required, and intervals needed, to clean the tray assemblies.

SUMMARY OF THE INVENTION

According to the present invention, there is provided an exchange column, perforated tray assembly comprising a plurality of tray sections, and connecting means for releasably connecting adjacent tray sections, the connecting means comprising, a) a plurality of catch openings in one of those adjacent tray section, and b) for each opening, a catch member attached to the other adjacent tray section, for releasably securing the tray sections by extending through that opening and contacting an underside of the said one tray section.

The said one of the tray sections may have a rounded edge, the catch openings may extend downwardly in a marginal edge portion of the tray section adjacent the rounded edge, and the catch members have hump portions humping over the rounded edge, tongues which extend through the openings, and leading ends which latch the hump portions on the rounded edge by contacting the underside of the said one of those tray sections.

The tray sections may be provided with catch openings along one side and catch members along an opposite side to the side containing the catch openings, so that tray sections are releasably secured together as strips.

A central tray section may be provided with catch openings on all sides, and trays adjacent to the central tray section may be releasably secured thereto by catch members on these tray sections extending through the openings in the central tray section.

Two central tray sections may be provided releasably secured together by adjacent sides, and other sides of these tray sections may have catch openings for releasably securing other tray sections thereto by catch members attached to these other tray sections.

The said one of those tray assemblies may have a rounded edge, and the catch openings may extend around a portion of the rounded edge.

The catch openings may be upwardly extending slots, and the catch members may be tapered fins depending from the said other tray section and increasing in depth towards the end of, and extend beyond the underside of, the said other tray section, to contact the underside of the said one of the tray sections and be held thereagainst by resting in the slots.

The portions of the fins which extend beyond the ends of the said other tray section may have rounded lower edges for easement into the slots.

The said one of the tray sections may have a rounded edge adjacent the openings, and the edge of the said other tray that is adjacent the rounded edge may be shaped to rest thereagainst.

At least perforations near the edges of the tray sections may form quincuncial patterns, with a central perforation thereof having an upper, annular seating therearound and providing a liquid path through that tray section, and a hollow, domed cap may be provided seated thereon, the domed cap having perforations.

Perforations may be provided in the catch members to provide passage through the connecting means.

For each tray section having catch openings, a stiffening plate may be provided depending from a portion of that tray section which is adjacent to the catch openings.

The stiffening plates may have sloping, liquid collecting ends provided with drainage openings.

BRIEF DESCRIPTION OF THE DRAWINGS

In the accompanying drawings which illustrate, by way of example, embodiments of the present invention, FIG. 3 is an enlarged, sectional scrap side view showing a catch member located in an opening in an adjacent tray, FIG. 4 is an enlarged, sectional scrap view of a perforation provided with a perforated, domed cap, FIG. 5 is a similar view to FIG. 3 but of a different catch member, FIG. 6 is a similar view to FIG. 3 but of a different catch member.

DETAILED DESCRIPTION OF THE PREFERRED EMBODIMENT

Figure 1:
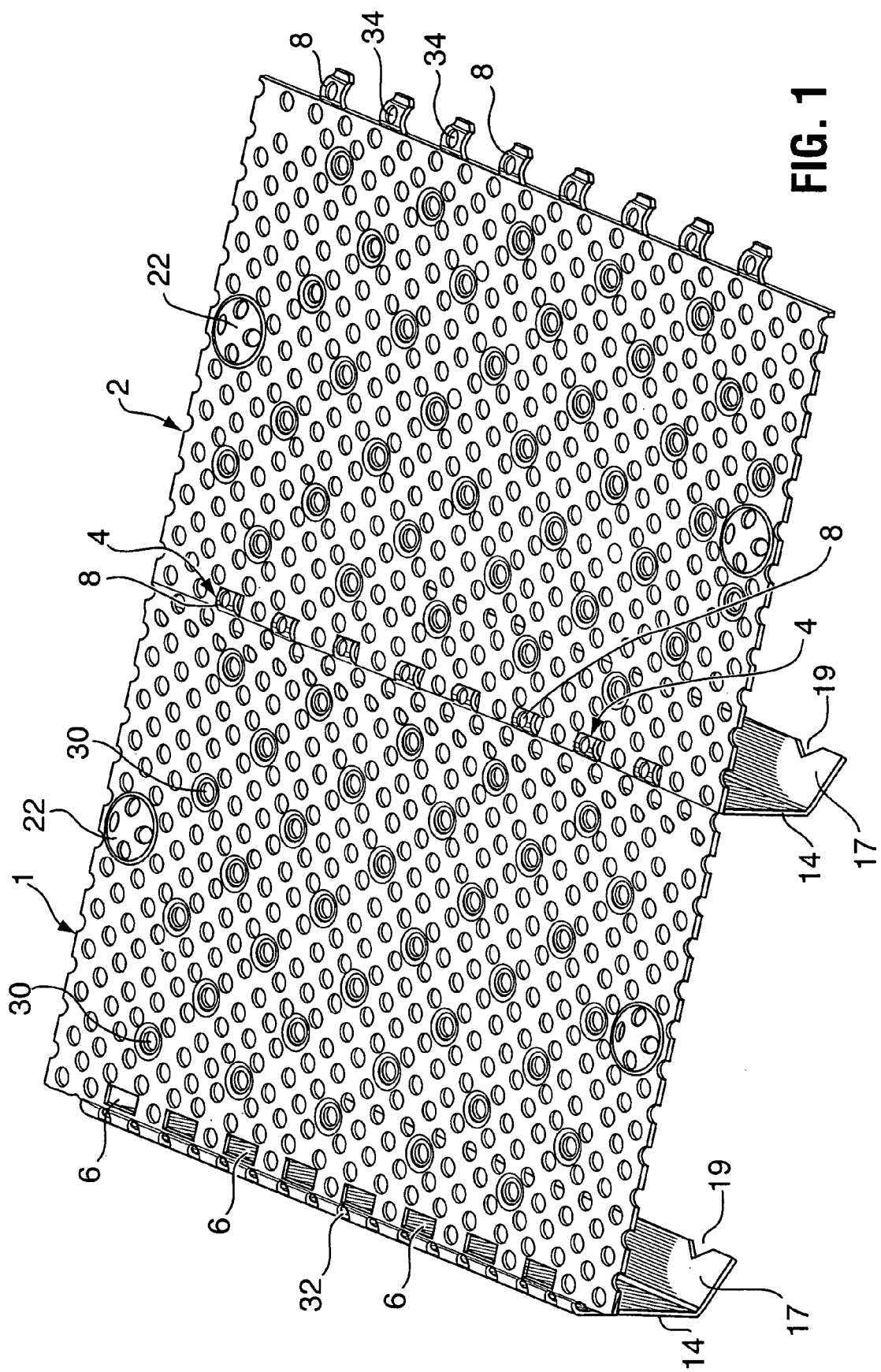
FIG. 1 is an angular view from above, of two adjacent sections of a perforated tray assembly of an exchange column.
Figure 2:
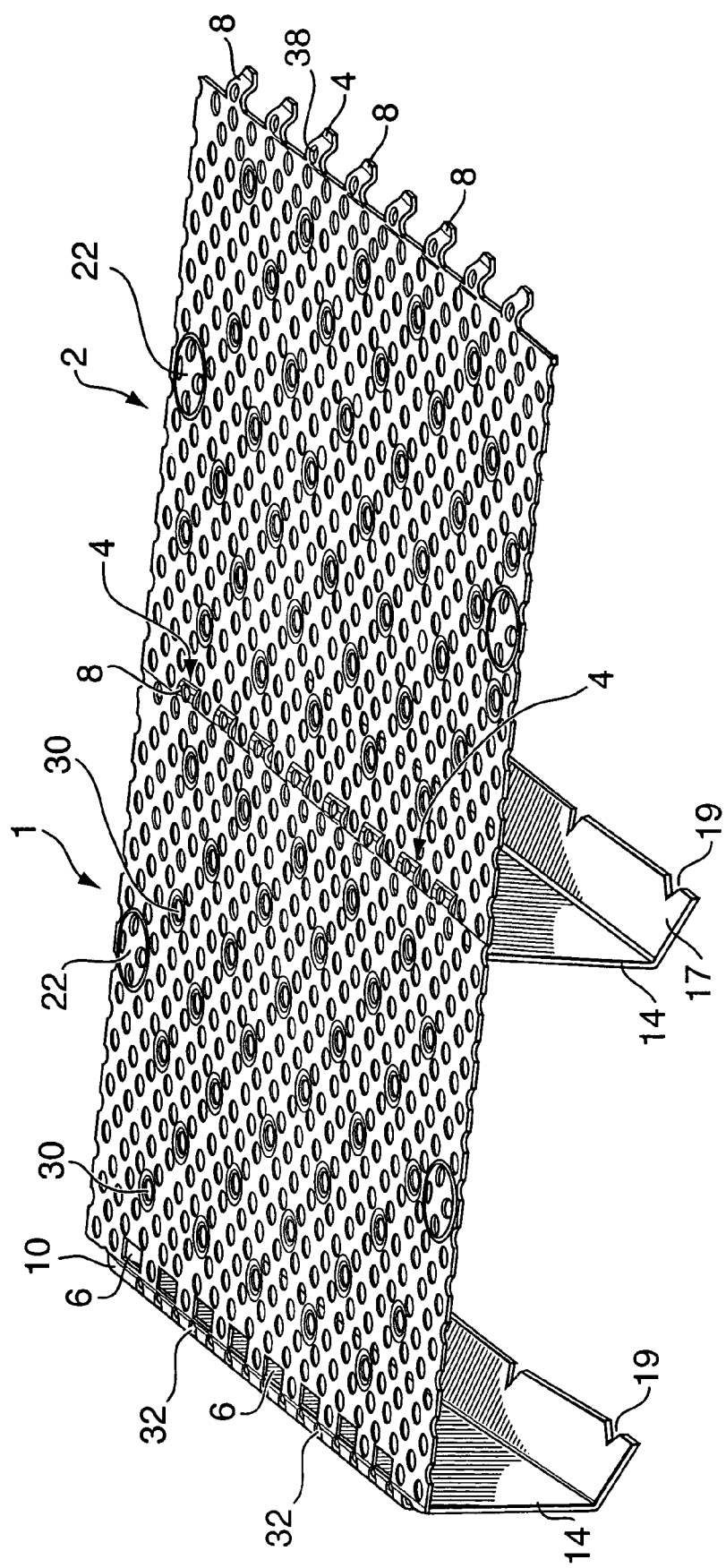
FIG. 2 is a similar view to FIG. 1, but viewing the adjacent sections closer to the horizontal.

In FIGS. 1 and 2 there is shown two tray sections, designated 1 and 2, of a perforated tray assembly of an exchange column, and connecting means, generally designated 4 for releasably connecting these adjacent tray sections 1 and 2.

The connecting means 4 comprises, a) a plurality of catch receiving openings, such as 6, in the one of the adjacent tray sections designated 2, and b) for each opening, such as 6, a catch member, such as 8, attached to the other adjacent tray section designated 1, for releasably securing these tray sections 1 and 2 by catching in the opening 6.

The catch openings extend downwardly in a marginal edge portion of the tray section 2.

As will be described later the tray sections 1 and 2 are intermediate of a perforated tray assembly and so, in this embodiment, are identical in that they are both provided with catch receiving openings 6 and catch members 8.

As is more clearly shown in FIG. 3, the tray sections 1 and 2, have rounded edges 10, and further comprise stiffening plates 14 adjacent the openings 6. The catch members, such as 8, comprise a hump portion 16 humping over the rounded edge 10, a tongue 18 which extends through the openings 6, and a leading end 20 which latches the hump portion on the rounded edge 10 by contacting the underside 22 of the tray section 2.

The stiffening plates 14 are provided with sloping, liquid collecting end portions 17 having drainage openings 19 (FIGS. 1 and 2) for any liquid collecting on the stiffening plates 16.

Preferably, as shown in FIGS. 1, 2 and 4 domed caps 22 with perforations 24 are provided in perforations, such as the perforation 26, at least at positions where stagnant areas occur on the tray assembly, such as adjacent the column. The domed caps 22 may be provided centrally in quincuncial perforations patterns, and may have shoulders 28 for seating on a step 26 in the perforation 30.

In some embodiments, perforations 32 (FIGS. 1 and 2) are provided in the rounded edges 10 and corresponding perforations 34 are provided in the catch members 8 for enhancing upward flow at these positions.

The tray sections 1 and 2 are connected by tilting the tray section 1 to slide the catch members 8, into the openings 6, until the hump portions 16 rest on the rounded edge 10, and then levelling the tray section 1 so that the leading ends 20 of the tongues 18 contact the underside 22 of the tray section 2, and, latch the hump portions 16 on to rounded edge 10.

In FIGS. 5 and 6, similar parts to those shown in FIG. 1 to 3 are designated by the same reference numerals, and the previous description is relied upon to describe them.

FIG. 5 shows a sectional, scrap side view of a catch member 36 that enters, and rests in, an opening 38 in the rounded edge portion 10. In this embodiment, the edge 40 of tray section 1, that is next to the rounded edge 10 of the tray section 2 is shaped to rest on the rounded edge 10.

FIG. 6 shows a sectional, scrap side view of a catch member 42 which is a tapered fin, depending from tray section 1, which increases in depth towards the end of, and extends beyond the underside of, the tray section 1 to contact the underside 22 of the tray section 2 and be held thereagainst by resting in a catch opening in the form of a downwardly extending slot 43 in the rounded edge portion 10. Preferably the portion of the fin 42 which extends beyond the tray section 1 has a rounded lower edge for easement into the catch opening 43.

The embodiments shown in FIGS. 5 and 6 latch the tray section 1 to the tray section 2 in a similar manner as that described with reference to FIGS. 1 and 3.

Figure 7:
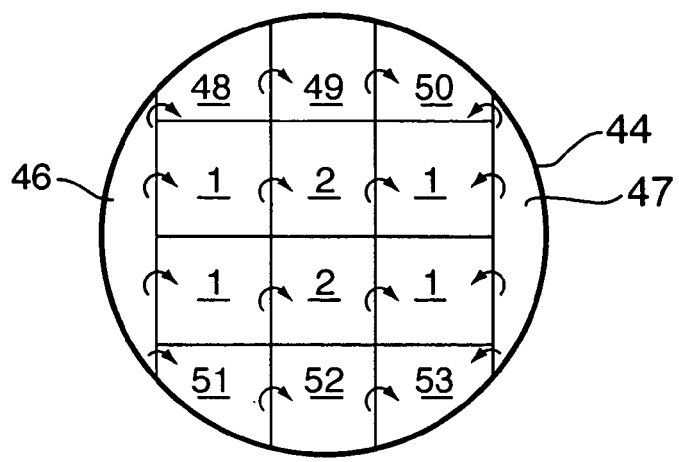
FIG. 7 to 9 are schematic plan views of different exchange column tray assemblies.
Figure 8:
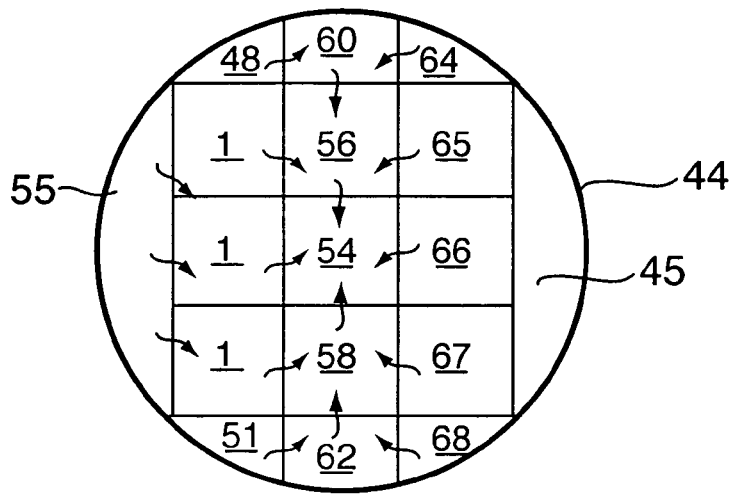
Figure 9:
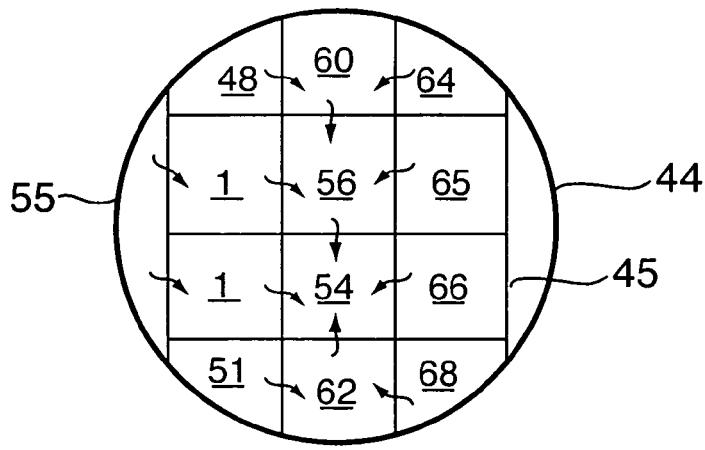

FIGS. 7 to 9 are schematic plan views of exchange column tray assemblies incorporating tray sections of the type, or similar to, the tray sections designated 1 and 2 in FIGS. 1, 2, 3, 5 and 6.

In FIG. 7 shows a tray assembly in a liquid/liquid exchange column 44, for receiving descending liquid from above, while ascending liquid through the tray assembly in contacted therewith.

Perforated side tray sections 46 to 53 form part of the tray assembly and are provided so that the tray assembly conforms to the internal contour of the column 44. The tray sections 46, 48 to 50 and 46, 51 to 53 are releasably secured together in this order in the same manner as the tray sections 1 and 2. The perforated sheet 48 is then releasably secured to the tray section 1, 45 and 51 in the same manner as the tray sections 1 and 2. The tray section 46, 48-49-50, 1-2-1, 1-2-1, and 46, 51-52-53 are secured in the directions of the arrows, starting from the right hand side, and then the tray section 44 is added.

In FIGS. 8 and 9, similar parts to those shown in FIG. 7 are designated by the same reference numerals, and the previous description is relied upon to describe them.

In FIGS. 8 and 9, an imperforate sheet 55 is provided to receive liquid from a downcomer, and a liquid drainage downcomer 45 is also provided.

In FIG. 8, a central tray section 54 is provided with catch receiving openings on all sides, the tray section 56 and 58 have catch members on the sides adjacent to the tray section 54, and catch receiving openings on all other sides. The tray section 60 and 62 have catch members on the sides adjacent to tray sections 56 and 58 respectively, and catch receiving openings on the other, opposing sides. The tray sections 64 to 68 have catch members on the sides adjacent to tray sections 60, 56, 54, 58 and 62 respectively. The tray section 54 is first placed in position, and then tray sections 54-56-60, and 54-58-62 are connected in that order. The tray sections 48-1-1-51 are then connected to the tray sections 60-56-54-58-62 respectively and then sheet 55 is connected to tray sections 48-1-1-51. The tray sections 64-65-66-67-68 are then connected to the tray sections 60-56-54-58-62 respectively. Thus tray sections 1-56-66-58 are releasably secured to the central tray section 54.

In this embodiment all of the tray sections are releasably secured together.

In FIG. 9, similar parts to those shown in FIG. 8 are designated by the same reference numerals, and the previous description is relied upon to describe them.

In FIG. 9, the row of tray sections 1-58-67 of FIG. 8 is omitted. In this embodiment, all of the tray sections are releasably secured together.

The tray assemblies described with reference to FIG. 1 to 9 may be used in, for example, liquid/liquid exchange columns and in liquid/gas exchange columns.

In other embodiments of the present invention, the domed caps 22 may comprise upwardly deformed portions of the tray sections 1 and 2.

In yet other embodiments of the present invention, the domed caps are formed separately and welded over openings in the tray sections 1 and 2.

While the domed caps 22 are provided where stagnant areas occur on the tray sections 1 and 2, as shown in FIGS. 1 and 2, the stepped perforations 26 may be provided in quincuncial patterns across the whole of the tray sections 1 and 2, without the domed caps 22 on them. This arrangement is useful in exchange columns where descending, relatively denser liquid gravitates downwardly through the stepped perforations 26 while vapor ascends through tray perforations around the stepped perforations 26. Also, perforations 26 allow for a uniform downward liquid distribution through tray sections 1 and 2.

We claim:

1. An exchange column, perforated tray assembly comprising a plurality of tray sections, and connecting means for releasably connecting adjacent tray sections, the connecting means comprising,
   a) a plurality of catch openings in one of those adjacent tray sections,
   b) for each opening, a catch member attached to the other adjacent tray section, for releasably securing the tray sections by extending through that opening and contacting an underside of said one tray section; and
   c) a central tray section having catch openings on all sides, and trays adjacent to the central tray section are releasably secured thereto by catch members on these tray sections extending through the openings in the central tray section.

2. A tray assembly according to claim 1, wherein two central tray sections are provided releaseably secured together by adjacent sides, and other sides of these tray sections have catch openings for releasably securing other tray sections thereto by catch members attached to these other tray sections.

3. A tray assembly according to claim 1, wherein the said one of those tray assemblies has a rounded edge portion, and the catch openings extend around a portion of the rounded edge.

4. A tray assembly according to claim 3, wherein the catch openings are upwardly extending slots, and the catch members are tapered fins depending from the said other tray section and increasing in depth towards the end of, and extend beyond the underside of, the said other tray section, to contact the underside of the said one of the tray sections and be held thereaginst by resting in the slots.

5. A tray assembly according to claim 4, wherein the portions of the fins which extend beyond the ends of the said other tray section have rounded lower edges for easement into the slots.

6. An exchange column, perforated tray assembly comprising a plurality of tray sections, and connecting means for releasably connecting adjacent tray sections, the connecting means comprising,
   a) a plurality of catch openings in one of those adjacent tray sections,
   b) for each opening, a catch member attached to the other adjacent tray section, for releasably securing the tray sections by extending through that opening and contacting an underside of said one tray section,
   c) wherein at least perforations near the edges of the tray sections form quincuncial patterns, with a central perforation thereof having an upper, annular seating therearound and providing a path through that tray section, and a hollow, domed cap is provided seated thereon, the domed cap having perforations.

7. An exchange column, perforated tray assembly comprising a plurality of tray sections, and, connecting means for releasably connecting adjacent tray sections, the connecting means comprising,
   a) a plurality of catch openings in one of those adjacent tray sections,
   b) for each opening, a catch member attached to the other adjacent tray section, for releasably securing the tray sections by extending through that opening and contacting an underside of said one tray section, and
   c) a stiffening plate for each tray section having catch openings, said stiffening plate depending from a portion of that tray section which is adjacent to the catch openings, each said stiffening plate further having sloping, liquid collecting ends provided with drainage openings.

* * * * *